United States Patent
Wong

(10) Patent No.: US 12,471,846 B2
(45) Date of Patent: Nov. 18, 2025

(54) EARPIECE CAPABLE OF INTERACTING WITH THE TRAGUS AND A METHOD OF PROVIDING CONTINUOUS PHYSIOLOGICAL DETECTION

(71) Applicant: WELL BEING DIGITAL LIMITED, New Territories (HK)

(72) Inventor: Ming Yip Wallace Wong, New Territories (HK)

(73) Assignee: WELL BEING DIGITAL LIMITED, New Territories (HK)

( * ) Notice: Subject to any disclaimer, the term of this patent is extended or adjusted under 35 U.S.C. 154(b) by 544 days.

(21) Appl. No.: 17/633,171

(22) PCT Filed: Jul. 1, 2020

(86) PCT No.: PCT/CN2020/099732
§ 371 (c)(1),
(2) Date: Feb. 4, 2022

(87) PCT Pub. No.: WO2021/022951
PCT Pub. Date: Feb. 11, 2021

(65) Prior Publication Data
US 2022/0330890 A1    Oct. 20, 2022

(30) Foreign Application Priority Data
Aug. 4, 2019   (HK) .................. 19127713.6

(51) Int. Cl.
*A61B 5/00*   (2006.01)
*A61B 5/0205*   (2006.01)
(Continued)

(52) U.S. Cl.
CPC .......... *A61B 5/6815* (2013.01); *A61B 5/0205* (2013.01); *A61B 5/0531* (2013.01);
(Continued)

(58) Field of Classification Search
None
See application file for complete search history.

(56) References Cited

U.S. PATENT DOCUMENTS 5,396,563 A * 3/1995 Yoshimi ............... H04R 1/1016
  381/372
9,883,278 B1 * 1/2018 Lin ....................... H04R 1/1016
(Continued)

FOREIGN PATENT DOCUMENTS

CN   206908783 U   1/2018
JP   2016158878 A  9/2016
(Continued)

OTHER PUBLICATIONS

Foreign Communication from a Related Counterpart Application, International Search Report and Written Opinion dated Oct. 10, 2020, International Application No. PCT/CN2020/099732 filed on Jul. 1, 2020.

*Primary Examiner* — Carl H Layno
*Assistant Examiner* — Manolis Pahakis

(57) ABSTRACT

An earpiece having light sources and optical sensors arranged to obtain physiological data from the tragus of an ear. At least one extra light source or optical sensor is provided such that there is redundancy. The redundancy allows for misalignment of the earpiece while still having sufficient number of light sources and optical sensors to continuously obtaining physiological data.

2 Claims, 14 Drawing Sheets

(51) Int. Cl.
  *A61B 5/0531* (2021.01)
  *A61B 5/282* (2021.01)
  *A61B 5/318* (2021.01)
  *H04R 1/10* (2006.01)

(52) U.S. Cl.
  CPC .............. *A61B 5/282* (2021.01); *A61B 5/318* (2021.01); *H04R 1/1016* (2013.01)

(56) References Cited

U.S. PATENT DOCUMENTS

| | | | | |
|---|---|---|---|---|
| 10,117,012 | B2* | 10/2018 | Saulsbury | H04R 1/1041 |
| 10,238,301 | B2* | 3/2019 | Weebadde | A61B 5/349 |
| 10,827,249 | B1* | 11/2020 | Pine | H04R 1/1041 |
| 11,559,255 | B1* | 1/2023 | Lisy | A61B 5/6817 |
| 11,582,548 | B2* | 2/2023 | Bui | A61B 5/0006 |
| 11,755,277 | B2* | 9/2023 | Verbeke | A61B 5/0059 704/235 |
| 2004/0136543 | A1* | 7/2004 | White | H04R 1/08 381/74 |
| 2007/0135717 | A1* | 6/2007 | Uenishi | A61B 5/6815 600/509 |
| 2008/0025539 | A1* | 1/2008 | Bailey | H04R 25/75 381/322 |
| 2010/0217099 | A1* | 8/2010 | LeBoeuf | A61B 5/6815 600/301 |
| 2012/0156933 | A1* | 6/2012 | Kreger | A61B 5/14552 439/625 |
| 2014/0213864 | A1* | 7/2014 | Abdul-Hafiz | A61B 5/14552 600/339 |
| 2014/0241563 | A1* | 8/2014 | Monahan | H04R 1/1058 381/380 |
| 2014/0288447 | A1* | 9/2014 | Luna | A61B 5/6838 600/508 |
| 2015/0351688 | A1* | 12/2015 | Just | A61B 5/14552 600/407 |
| 2016/0007933 | A1 | 1/2016 | Duddy et al. | |
| 2016/0051184 | A1* | 2/2016 | Wisbey | A61B 5/6817 600/595 |
| 2016/0205475 | A1* | 7/2016 | Shanmugam | H04R 1/1041 381/74 |
| 2016/0206221 | A1* | 7/2016 | Kim | A61B 5/681 |
| 2016/0249839 | A1* | 9/2016 | Wong | A61B 5/02416 600/323 |
| 2017/0000359 | A1* | 1/2017 | Kohli | A61B 5/6826 |
| 2017/0034615 | A1* | 2/2017 | Mankodi | A61B 5/6843 |
| 2017/0078785 | A1* | 3/2017 | Qian | H04R 1/105 |
| 2017/0087364 | A1* | 3/2017 | Cartledge | A61N 1/18 |
| 2017/0118551 | A1* | 4/2017 | Wagner | A61B 5/6898 |
| 2017/0258329 | A1* | 9/2017 | Marsh | A61B 5/1118 |
| 2018/0220902 | A1* | 8/2018 | LeBoeuf | A61B 5/4872 |
| 2018/0279952 | A1* | 10/2018 | Orron | A61B 5/02055 |
| 2019/0000386 | A1* | 1/2019 | Watanabe | A61B 5/02116 |
| 2019/0029540 | A1* | 1/2019 | Negishi | A61B 5/14546 |
| 2019/0029593 | A1* | 1/2019 | Orron | H04R 1/105 |
| 2019/0075388 | A1* | 3/2019 | Schrader | G06F 3/011 |
| 2019/0117155 | A1* | 4/2019 | Cross | H04R 25/652 |
| 2019/0151604 | A1* | 5/2019 | Harper | A61H 23/02 |
| 2019/0212198 | A1* | 7/2019 | Marsh | G01J 5/0011 |
| 2019/0212436 | A1* | 7/2019 | Baheti | G01S 13/723 |
| 2019/0223747 | A1* | 7/2019 | Chou | A61B 5/291 |
| 2019/0306613 | A1* | 10/2019 | Qian | H04R 5/04 |
| 2019/0346934 | A1* | 11/2019 | Schrader | G06F 3/017 |
| 2020/0100010 | A1* | 3/2020 | Yang | H04R 1/10 |
| 2020/0238085 | A1* | 7/2020 | Khodaparast | A61N 1/0492 |
| 2020/0324105 | A1* | 10/2020 | Po | A61B 5/0022 |
| 2020/0368527 | A1* | 11/2020 | Asirvatham | A61B 5/6803 |
| 2021/0069488 | A1* | 3/2021 | Trotter | A61N 1/36078 |
| 2022/0369967 | A1* | 11/2022 | Kaya | A61B 5/14552 |
| 2023/0147868 | A1* | 5/2023 | Mattavelli | B63C 11/12 2/9 |
| 2023/0293881 | A1* | 9/2023 | Gourine | A61B 5/021 607/59 |
| 2024/0366093 | A1* | 11/2024 | Gervaix | A61B 5/02055 |

FOREIGN PATENT DOCUMENTS

| | | |
|---|---|---|
| WO | 2017019885 A1 | 2/2017 |
| WO | 2021022951 A1 | 2/2021 |

\* cited by examiner

EARPIECE CAPABLE OF INTERACTING WITH THE TRAGUS AND A METHOD OF PROVIDING CONTINUOUS PHYSIOLOGICAL DETECTION

CROSS-REFERENCE TO RELATED APPLICATIONS

The present application is a filing under 35 U.S.C. 371 as the National Stage of International Application No. PCT/CN2020/099732, filed Jul. 1, 2020, entitled "AN EARPIECE CAPABLE OF INTERACTING WITH THE TRAGUS AND A METHOD OF PROVIDING CONTINUOUS PHYSIOLOGICAL DETECTION," which claims priority to Hong Kong Application No. HK 19127713.6 filed with the Intellectual Property Office of Hong Kong on Aug. 4, 2019, both of which are incorporated herein by reference in their entirety for all purposes.

FIELD OF INVENTION

This invention relates to detectors for user physiological information. In particular, this invention relates to ear worn, wearable detectors.

BACKGROUND OF INVENTION

Many devices have been proposed that could detect physiological changes that could be worn on the body for a long time. Some of these are worn on the wrist, others on the trunk of the body, and yet others in the form of an earpiece having an extension could be inserted into the ear canal (see FIG. 1 showing such a prior art for comparative purpose, the extension of the earpiece aligned inside the canal in the direction VV).

However, people engaged in a wide variety of activities. Sometimes it is not convenient to wear a device on the wrist, simply because the hand is engaged in activities that require much action. For example, a tennis player cannot be wearing a physiology monitor on his wrist without risking the accuracy of the monitor. Other times, it is not convenient for the user to wear a device inside the ear canal. For example, the user might have an ear infection, or has sensitive ear canals that cannot bear the touch of any insert into the canal.

Accordingly, it is desirable to provide a further alternative wearable mode that could add to the options for users of wearable monitors.

SUMMARY OF THE INVENTION

In a first aspect, the invention proposes an earpiece, the earpiece having a shape for fitting into the concha of an ear of an user, the earpiece having a surface for contacting the tragus of the ear; and a physiological sensor arranged on the surface such that the physiological sensor is capable of interacting with the tragus. Preferably, the physiological sensor comprises at least one light source and at least one optical sensor.

The invention provides an alternative to the use of the ear canal as the site of monitor. A earpiece which is only cradled in the ear concha and obtaining physiological readings from the ear tragus can be used on small children and infant, with lower likelihood of them crying in discomfort.

Typically, the at least one light source and the at least one optical sensor are arranged on the portion of the surface in order to be aligned along the length of the tragus when worn by the user.

More preferably, the surface has area which is excessive for contacting the tragus of the ear; the physiological sensor further comprising: a plurality of a sensor-part for interacting with the tragus; and the plurality of the sensor-part arranged in different positions on the area such that, when the position of the earpiece in the concha changes to move a part of the area out of contact with the tragus, another part of the area remains in contact with the tragus; and at least one of the plurality of the sensor-part on the other part of the area remains in interaction with the tragus.

The sensor-part typically operates with a counterpart. For example, the plurality of the sensor-part is a plurality of a light source. The counterpart is therefore an optical sensor. If so, it is preferable that at least one optical sensor is arranged between two of the plurality of the light source in an alignment which is along the length of the tragus when worn by the user. In this case, the invention provides the advantage of redundancy of one light source. In the event that the earpiece in the concha is not properly aligned with the tragus, and one of the light sources is not irradiating into the tragus, at least the optical sensor and the other light source remaining in contact with the tragus may provide continual monitoring of the user's physiology.

Alternatively, the plurality of the sensor-part is a plurality of an optical sensor. The counterpart is therefore a light source. If so, it is preferable that at least one light source is arranged between two of the plurality of the optical sensor in an alignment which is along the length of the tragus when worn by the user. In this case, the invention provides the advantage of redundancy of one optical sensor. In the event that the earpiece in the concha is not properly aligned with the tragus, and one of the optical sensors is detecting light that has passed through the tragus, at least the light source and the remaining optical sensor remaining in contact with the tragus may provide continual monitoring of the user's physiology.

Possibly, the plurality of the sensor-part is a plurality of an electrode of one polarity. Only one electrode of the other polarity may need to be provided in the earpiece to operate with the plurality of an electrode of the one polarity. Typically, the plurality of the electrode is for measuring skin impedance. Alternatively, the plurality of the electrode is for measuring cardio electric signals, to provide electrocardiograms.

Optionally, the surface has area which is excessive for contacting the tragus of the ear; the physiological sensor further comprises: a first electrode that is laid across the area to interact with the tragus; such that when the position of the earpiece changes to move a part of the area out of contact with the tragus, another part of the area remains in contact with the tragus to provide that a portion of the first electrode remains interacting with the tragus. The first electrode therefore overextends the tragus, and sliding the lengthy first electrode across the tragus as the earpiece is rotated in the concha maintains electrode contact with the tragus for continuous physiological monitoring. Typically, the physiological sensor further comprises a second electrode that is laid across the area to interact with the tragus; such that when the position of the earpiece changes to move a part of the area out of contact with the tragus, another part of the area remains in contact with the tragus to provide that a portion of the second electrode remains interacting with the tragus.

Preferably, the earpiece further comprises a speaker such that the earpiece is useable as an earphone.

The earphone may have wireless connection to a smartphone for downloading physiological data obtained by the earpiece. Alternatively, the earphone may have a cable connector for a cabled connection with a smartphone, also for downloading physiological data. This allows an earphone such as the Macintosh Airpod™, which does not comprise any digit for inserting into the ear canal, to include physiological devices which detect information from the tragus.

In a second aspect, the invention proposes a method of providing continuous physiological detection using a wearable earpiece, the method comprising steps of: providing an earpiece having a plurality of a sensor-part arranged in different positions on the earpiece; positioning the earpiece into a user's ear such that at least one of the plurality of the sensor-part interacts with the tragus; permitting the earpiece to be moved, such that the at least one of the plurality of the sensor-part is moved into a position in which this at least one of the plurality of sensor-part is unable to interact with the tragus, and at least another one of the plurality of the sensor-part is moved into a position in which this other one of the plurality of the sensor-part is able to continue interacting with the tragus.

Optionally, the plurality of the sensor-part is a plurality of optical sensor. Alternatively, the plurality of the sensor-part is a plurality of light emitter. In yet a further alternative, the plurality of the sensor-part is a plurality of an electrode.

The invention proposes that the tragus is the second best position of the outer ear anatomy, the ear canal being the best position, for wearing a device having an optical physiological detector, with the device capable of having other functions which camouflage its physiological detection purpose, such as a earphone. The rest of the outer ear parts, such as the concha, are too gently curved for ensuring continuous and isolated contact with optical detectors. Hence, the invention has made possible a good alternative to the use of the ear canal for apply optical detector.

BRIEF DESCRIPTION OF THE DRAWINGS

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

DESCRIPTION OF EMBODIMENTS

Figure 1:
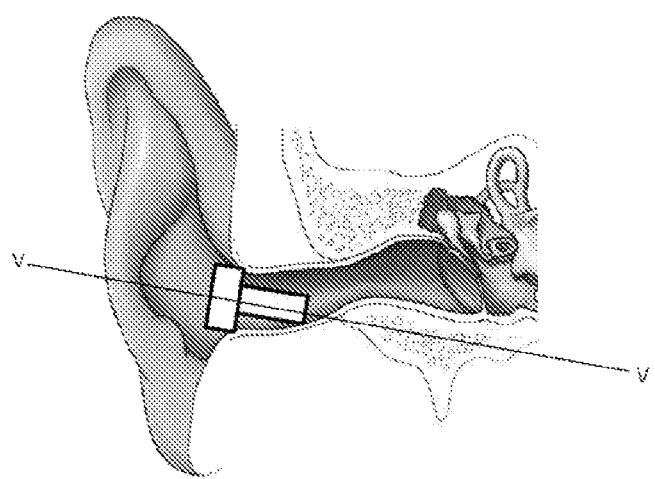
FIG. 1 shows a prior art for comparative purpose.
Figure 1A:
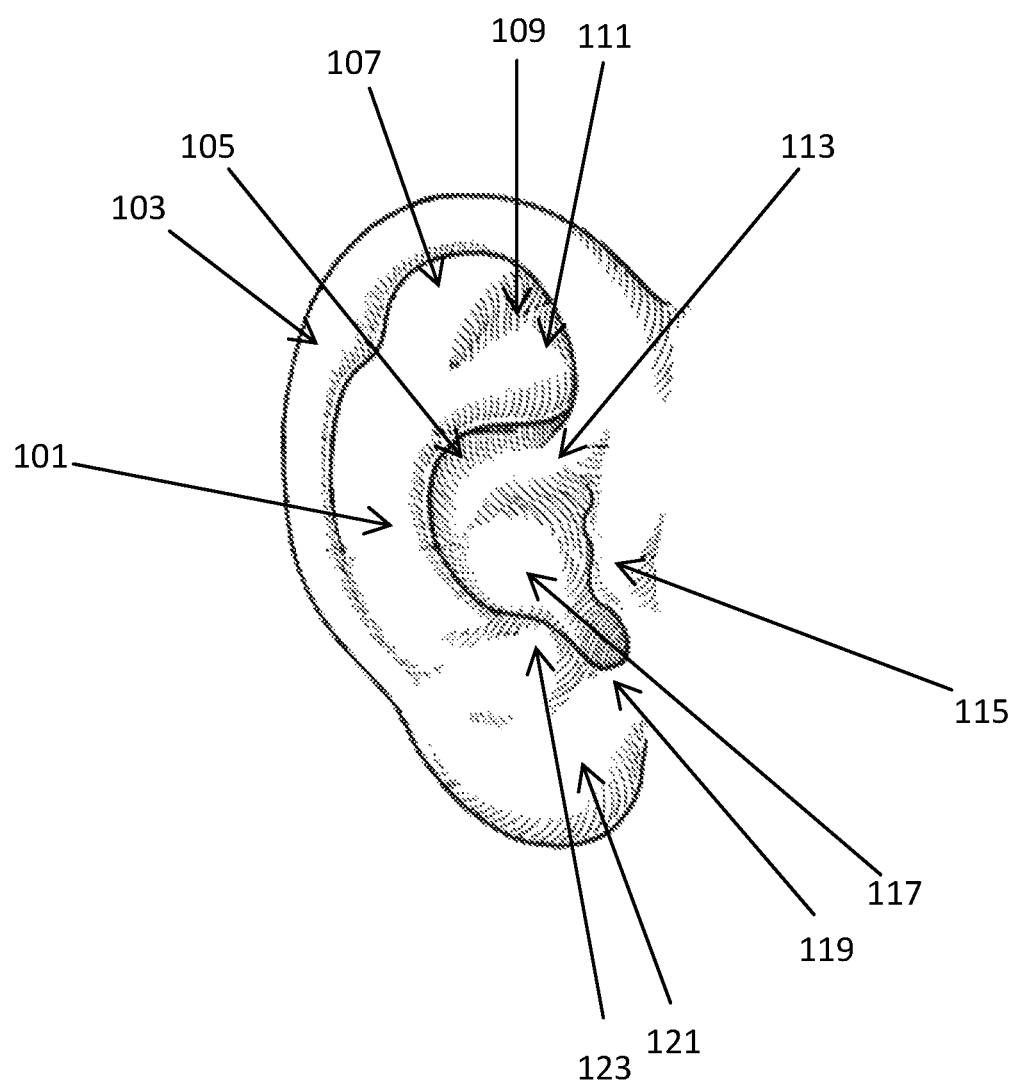
FIG. 1a shows the anatomy of the external ear.

FIG. 1a shows the anatomy of the outer ear, in which one finds the portions named anti-helix 101, helix 103, concna cymba 105, superior crus 107, triangular fossa 109, inferior crus 111, helicis crus 113, tragus 115, concha cavum (usually known as concha for short) 117, intertragic notch 119, lobule 121, anti-tragus 123.

The tragus 115 is a small pointed eminence of the external ear in front of the concha 117, and projecting backwardly over the ear canal. The nearby anti-tragus 123 projects forwardly and upwardly.

Figure 2:
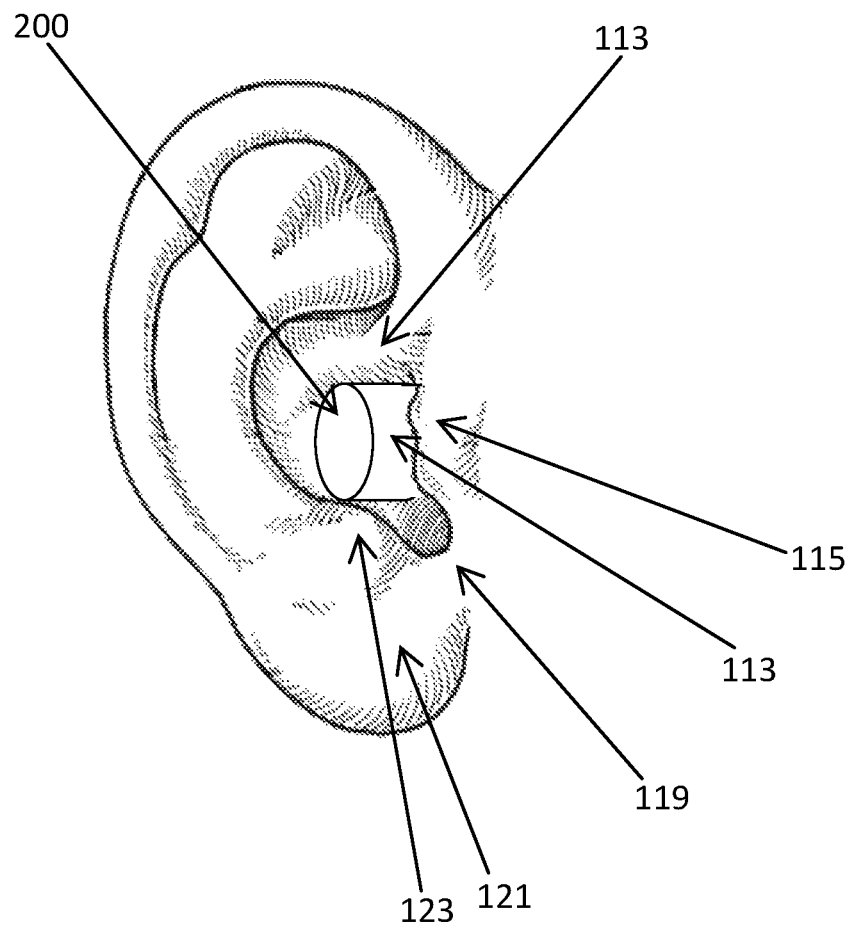
FIG. 2 shows an embodiment which is placed into the concha of the external ear.

FIG. 2 shows an earpiece 200 which is shaped like a disc and having a generally circular shape in cross-sectional side view. The earpiece 200 has suitable dimensions for it to be nested in the concha 117 of the ear, such that the circumference of the earpiece 200 presses against the surface of the tragus 115 facing the anti-helix 101.

Figure 3:
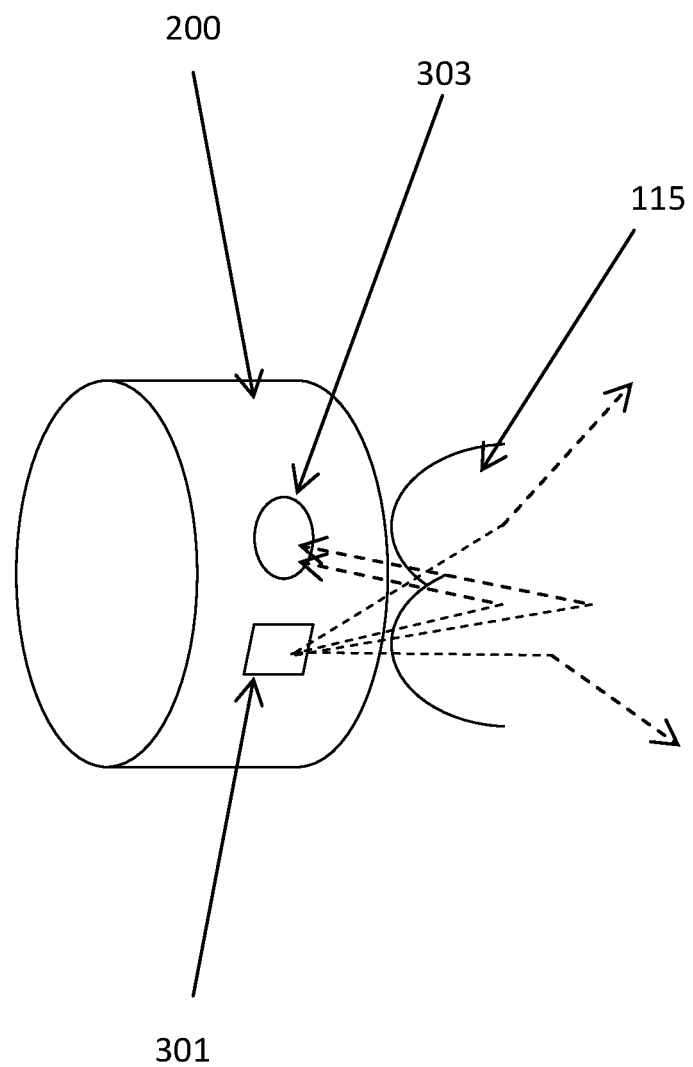
FIG. 3 is a closed up view of the embodiment of FIG. 2.

FIG. 3 shows a closed up view of the earpiece 200. The surface of the circumferential side, or edge, of the earpiece 200 is provided with a light source 301 and an optical sensor 303. The light source 301 is typically a light emitting diode (LED) and the optical sensor 303 is typically a photodiode, although other sources of light and light detectors may be used. Such light source 301 and optical sensor 303 pairs have been used in photoplethysmography. In the present embodiment, the light source 301 is in a position to emit light into the tragus 115 of the ear. FIG. 3 illustrates the tragus 115 a little distance away from the light source 301 and the optical sensor 303 for the purpose of explaining the how the earpiece 200 works. In practice, the circumferential side of the earpiece 200 is in contact with the tragus 115 so that the light source 301 and the optical sensor 303 are covered by the tragus 115. This ensures that ambient light is generally unable to reach the optical sensor 303, and as much as possible of light emitted by the light source 301 is irradiated into the tragus 115 and not into the surroundings.

Preferably, the light source 301 emits monochromatic light in a frequency which can be absorbed by blood. Furthermore, it is also preferable although not necessarily, the optical sensor 303 is able to detect the particular frequency of light from the optical sensor 303 selectively. This can be achieved by placing an optical filter over the optical sensor 303 to ensure only light of the selected frequency is able to excite the optical sensor 303.

FIG. 3 illustrates how light shown in dashed lines issues from the light source 301 and penetrates into the tragus 115. Some part of the light is absorbed by blood in the tissue and is converted into heat or other forms of energy. Another part of the light is simply dispersed internally within the tissue. As a result, the light is scattered within the tragus 115. A portion of the scattered light re-emerges from the tragus 115 at the part of the tragus 115 which is in contact with the optical sensor 303, and reaches the optical sensor 303.

As blood flow in the tragus 115 pulsates by the pumping of the heart, the amount of light which is absorbed by blood increases and decreases according to pulsating blood content. Consequently, the amount of light which passes through the tragus 115 to reach the optical sensor 303 fluctuates. Using signal analysis, the pulse of the user can be analysed to deduce his heart condition, blood pressure, fitness and exercise effectiveness, and even psychological stress level. For example, by monitoring the extent of the variation of the period between each consecutive heartbeat, heart rate variability (HRV) of the user can be calculated.

Low heart rate variability indicates that a person is highly stressed. Similar signal processing and statistical techniques for monitoring physiological and psychological conditions from the pulse are known and have been developed by many research groups, and these do not require elaboration here.

Figure 4:
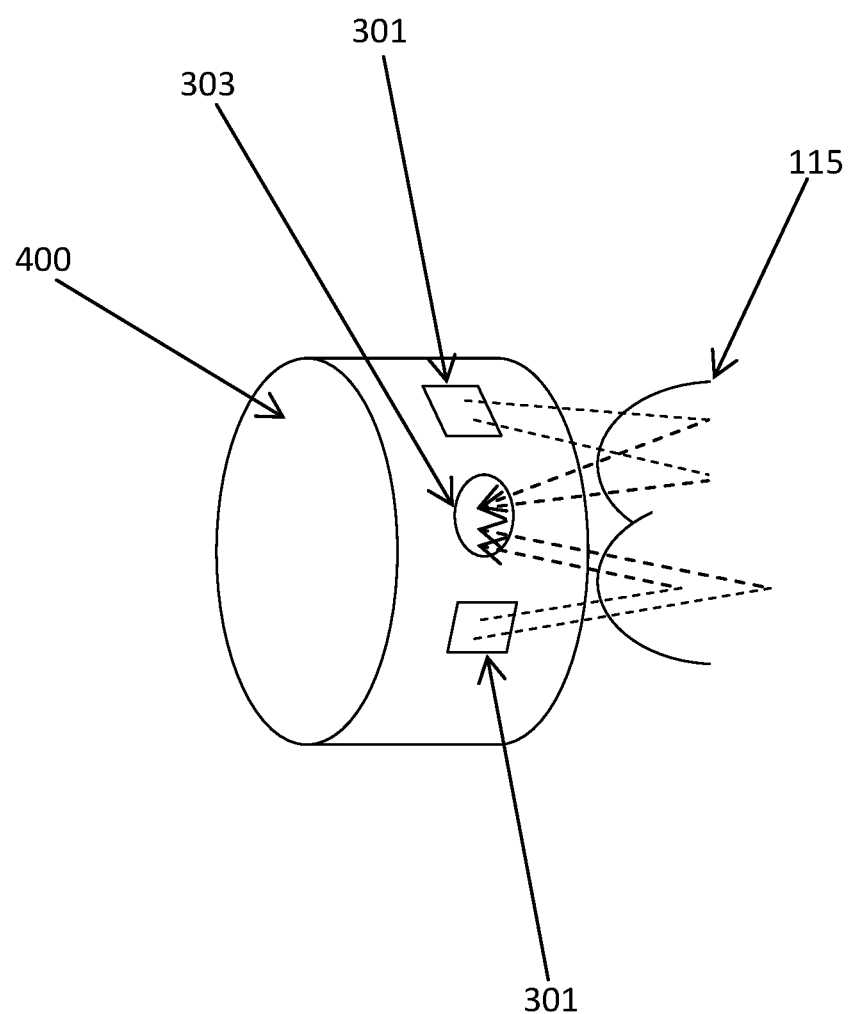
FIG. 4 is a closed up view of a variation of the embodiment of FIG. 2.

FIG. 4 shows another embodiment 400 in which there are two light sources 301 and one optical sensor 303. The two light sources 301 and the optical sensor 303 are shown arranged on the side of the earpiece 400, and are vertically arranged in a column. Typically, the two light sources 301 and the optical sensor 303 are arranged so close each other that they can be both covered by the tragus 115. Preferably, the optical sensor 303 is placed between the two light sources 301.

As with FIG. 3, FIG. 4 is a schematic illustration. Although the light sources 301 and optical sensor 303 are shown spaced away from the tragus 115 for clarity, the skilled reader would appreciate that the tragus 115 covers over the light sources 301 and the optical sensor 303 in practice.

If the user is wearing the earpiece 200 properly, the tragus 115 covers the entire column of light sources 301 and optical sensor 303. Light from both light sources 301 enters the tragus 115 and is back-scattered or reflected to be detected by the optical sensor 303. However, if the user is careless, and rotates the earpiece 200 in the concha 117, and exposes one of the light sources 301 such that is it no longer covered over by the tragus 115, the distances between the light sources 301 and the optical sensor 303 are such that the other one of the light sources 301 is likely to remain under the cover of the tragus 115 along with the optical sensor 303.

Accordingly, it is preferable that the distance between the two light sources 301 is less than the length of the average tragus. Typically, the distance is about 5 mm.

Figure 5:
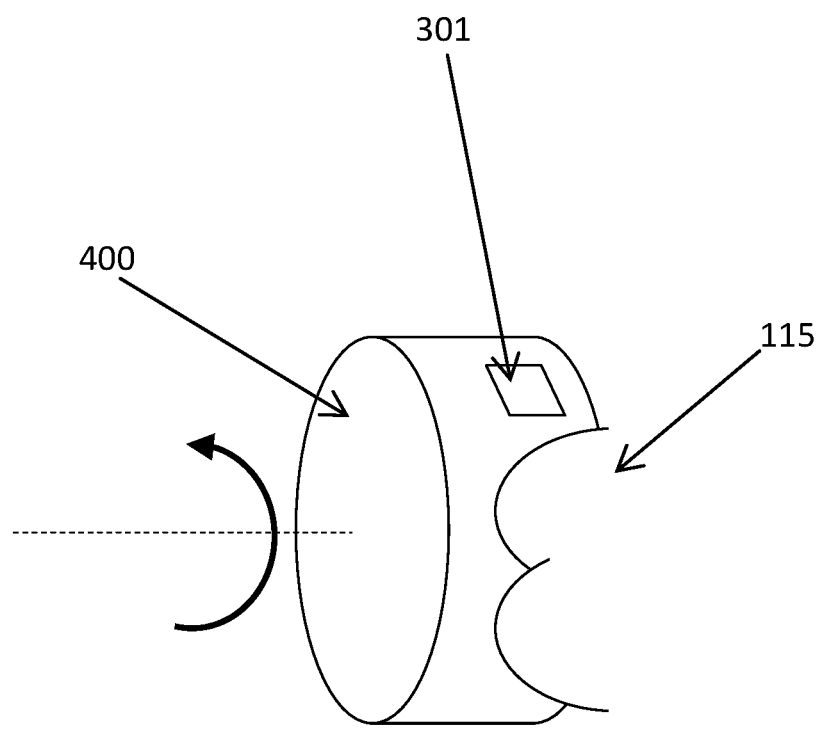
FIG. 5 illustrates an advantage provided by the embodiment of FIG. 4.

FIG. 5 shows the case where the earpiece 400 in FIG. 4 has rotated anti-clockwise in the concha 117 of the left ear, and the light source 301 higher up in the column of light sources 301 and optical sensor 303 has escaped the cover of the tragus 115 and therefore unable to deliver light into the tragus 115. Nevertheless, within a limited extent of rotation of the earpiece 400, both the lower light source 301 and the optical sensor 303 are still covered by and in contact with the tragus 115. Hence, light from the lower light source 301 is still able to enter the tragus 115, and be detected by the optical sensor 303.

Figure 6:
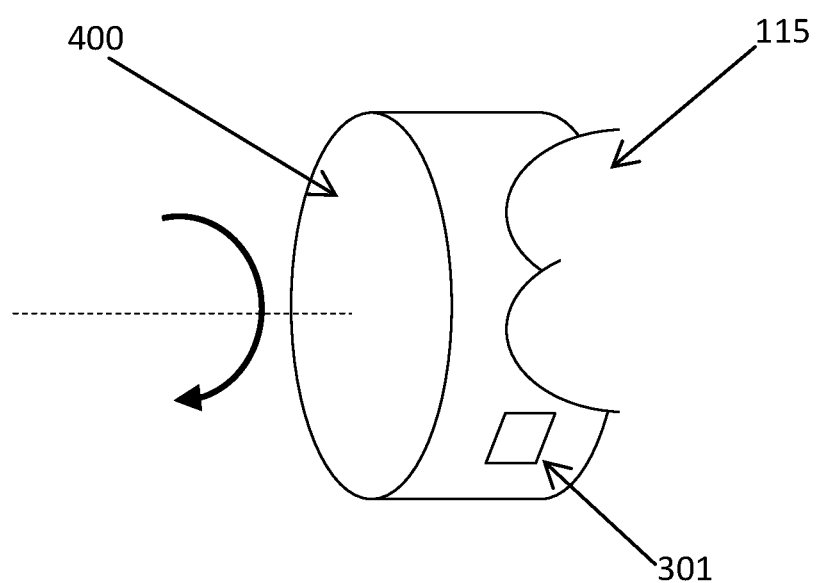
FIG. 6 also illustrates an advantage provided by the embodiment of FIG. 4.

FIG. 6 shows the case where the earpiece 400 in FIG. 4 has rotated clockwise, and the light source 301 lower down in the column of light sources 301 and optical sensor 303 has escaped the cover of the tragus 115, and therefore unable to deliver light into the tragus 115. Nevertheless, within a limited extent of rotation of the earpiece 200, both the upper light source 301 and the optical sensor 303 are still covered by and in contact with the tragus 115. Hence, light from the upper light source 301 is able to enter the tragus 115, and be detected by the optical sensor 303.

Figure 7:
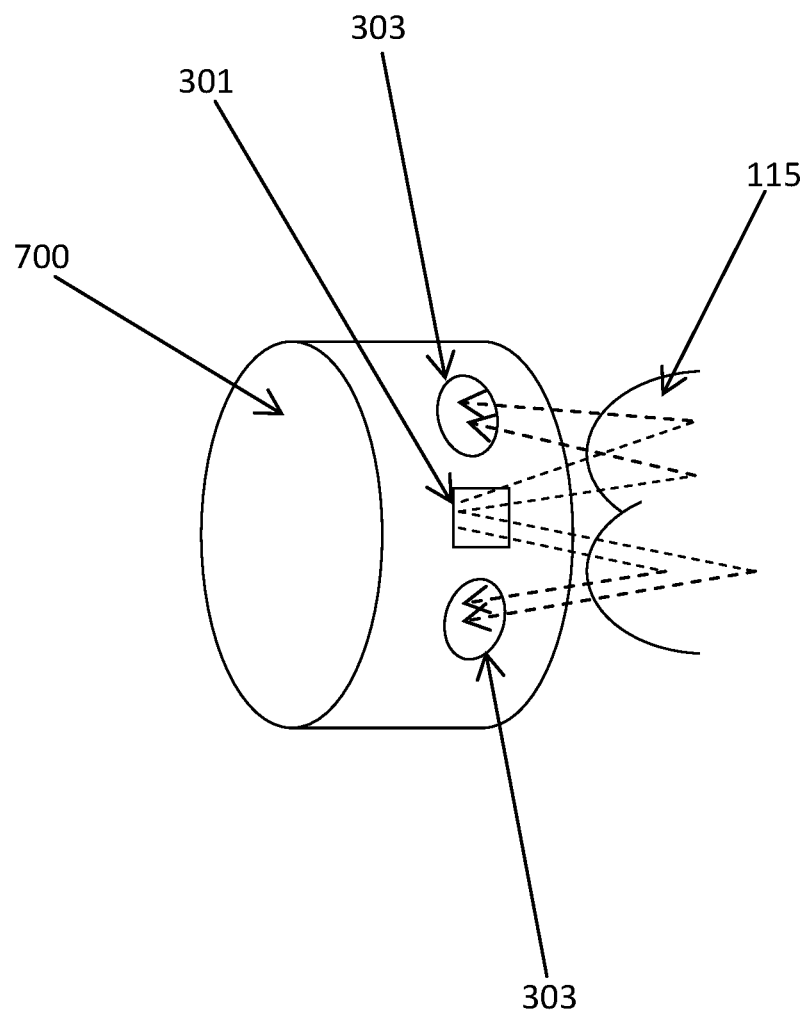
FIG. 7 shows a variation of the embodiment of FIG. 4.

In a variation 700 of the embodiment of FIG. 4, as shown in FIG. 7, two optical sensors 303 are used with one light source 301, instead of two light sources 301 used with one optical sensor 303. The light source 301 is in the centre of an optical sensor-light source-optical sensor 303 column. However, if the user becomes careless, and rotates the earpiece 200 in the concha 117, and exposes one of the optical sensors 303 such that that optical sensor 303 is no longer covered over by the tragus 115, the distances between the optical sensors 303 and the light source 301 are such that the other one of the optical sensors 303 is likely to remain under the cover of the tragus 115 along with the light source 301.

The earpiece 400, 700 is a suitable device for a careless user because despite rotation of the earpiece 400, 700 in situ in the concha 117 within a tolerable extent, at least one of the sensor parts, i.e. light sources 301 or the optical sensors 303, which are provided in an excess or redundant number, is likely to remain covered by the tragus 115, and observations of the user's physiological data remain steady and continuous without a break. In other words, the earpiece 400, 700 has at least one extra light source 301 or optical sensor 303 to provide redundancy which allows for misalignment of the earpiece 200.

Although the drawings show an earpiece 200, 400, 700 suitable for the left ear, the skilled man understands that an earpiece of mirror image dimensions can be made for the right ear. To use the earpiece 200, 400, 700, the user simply places the earpiece 200, 400, 700 into the concha 117 of his ear, and rotates the earpiece 200, 400, 700 into the correct position where the tragus 115 covers all the optical sensors 303 and light sources. More preferably, however, the disc shape of the earpiece 200, 400, 700 is made such that both sides of the disc are able to fit into the concha 117 of both the right and left ear. In this way, production cost could possibly be reduced since only one mould is needed to produce an earpiece 200, 400, 700 suitable for both the right concha 117 and left concha 117.

In both the embodiments of FIG. 4 and FIG. 7, a further variation can be provided in that different frequencies of light can be used in the same earpiece 400, 700. In FIG. 4, for example, where there are two light sources 301 emitting light into the tragus 115 by one optical sensor 303, the two light sources 301 can be emitting in different electromagnetic frequencies, such as in red and infrared light. As there is only one optical sensor 303 the two light sources 301 take turns to emit light, one after the other, in quick succession. The earpiece 400 comprises a microcontroller which can identify when is which one of the light sources 301 emitting light, and can attribute the readings of the optical sensor 303 to the correct light source 301 accordingly. As the light sources 301 switch over very quickly, the data read of the two different electromagnetic frequencies is virtually continuous. If the reading of the optical sensor 303 for anyone of the electromagnetic frequency is much lower than the reading for the other electromagnetic frequency, it means that the light source 301 must have been shifted away from being able to emit into the tragus 115.

Provided that the user maintains the correct positioning of the earpiece 400, and two electromagnetic frequencies are used at the same time to monitor blood flow in the tragus 115, more information than the mere pulse can be obtained, such as saturation of oxygen in blood which requires measuring the difference between absorption of red light and infrared light. This technology is known and does not require elaboration here.

The embodiment 700 of FIG. 7 can also be varied in a similar way. The light source 301 in FIG. 7 can be emitting in a polychromatic range of different electromagnetic frequencies, such as a range which include both red and infrared, or simply white light. Each of the two optical sensors 303 is provided with different optical filters so that the optical sensors 303 detect different electromagnetic frequencies. There is no need for any of the light source 301 and optical sensors 303 to operate in the alternative, as both optical sensors 303 can operate at the same time. If the readings of any one of the optical sensors 303 is exceptional, such as if the detected amount of light is much higher than the reading of the other optical sensor 303, it might mean that the optical sensor 303 have been shifted away from the tragus 115 and is exposed to ambient light. In this case, the readings of the shifted optical sensor 303 are disregarded, while the readings of the other optical sensor 303 remain useable to continue monitoring the pulse of the user.

Preferably, the earpiece 200, 400, 700 contains a gyrometer for sensing the uprightness of the earpiece 200, 400, 700. If the earpiece 200, 400, 700 is rotated drastically from an initial position in which readings which appeared reasonable, the earpiece 200, 400, 700 issues an alarm such as a faint beeping sound from an in-built sonic device to warn the user to check the orientation of the earpiece 200, 400, 700.

Figure 8:
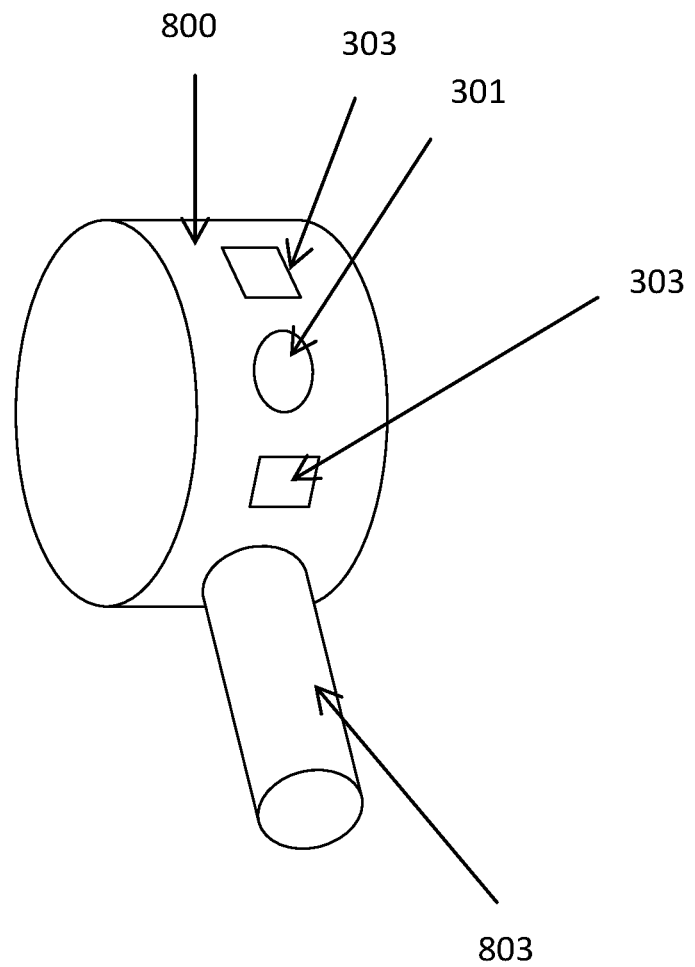
FIG. 8 also shows a variation of the embodiment of FIG. 4.

FIG. 8 illustrates an earpiece 800 which has an antenna and a microphone in a stem 803 hanging down from the body of the earpiece 800. The body of the earpiece 800 is suitable for being situated into the concha 117 of an ear, like the afore-described embodiments. The earpiece 800 contains a speaker (not illustrated), and therefore functions as an earphone, in a manner similar to that of the Airpod™ of Macintosh. The shape of the earphone body merely lines the concha 117 and does not have any parts that insert into the ear canal. Accordingly, such an earpiece 800 benefit from having the light sources 301 and optical sensors 303 arranged to irradiate into the tragus 115, since use of the ear canal is not possible.

Figure 8A:
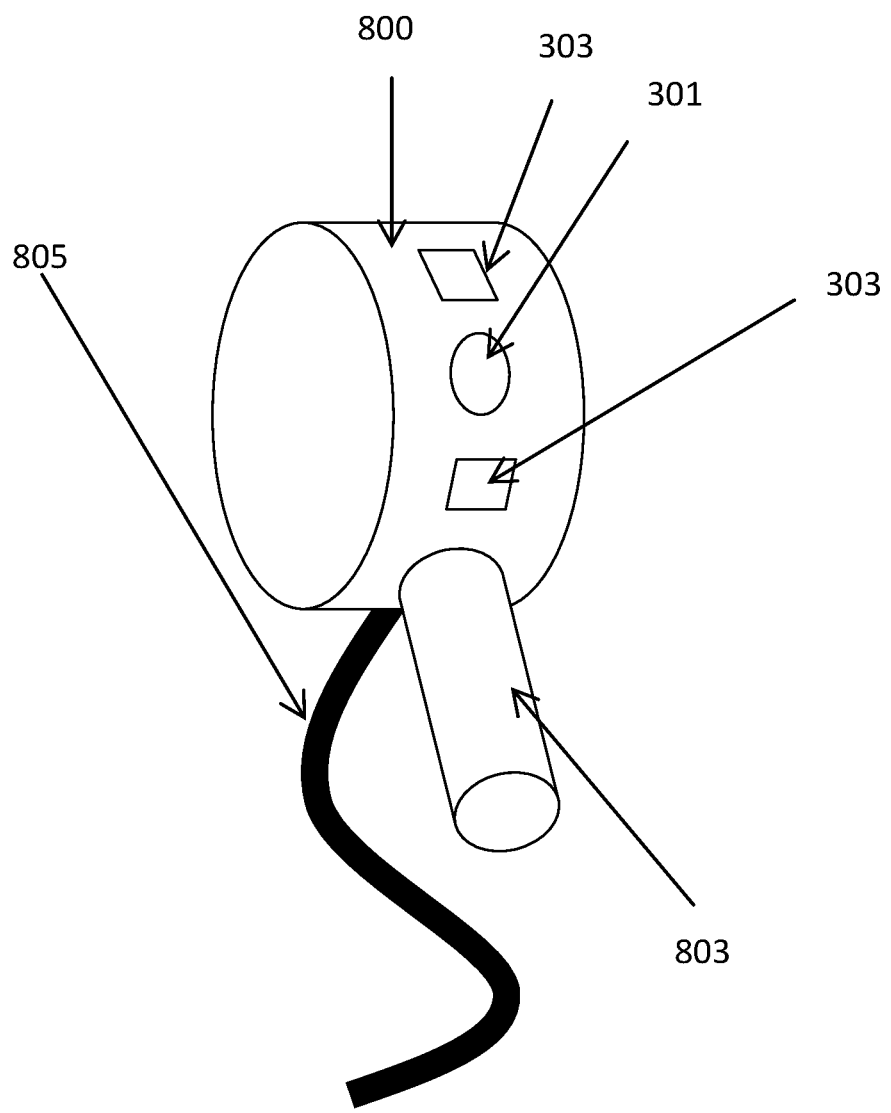
FIG. 8a shows a variation of the embodiment of FIG. 8.

Within the earpiece 800 are required microprocessors and memory for controlling the operations of the light sources 301 and the optical sensors 303. Typically, the memory includes firmware for instructing the performance of the microprocessor. In order for the earpiece 800 to be able to communicate physiological data, the earpiece 800 preferably comprises a wireless transceiver, and may send data though any known communication protocol such as Bluetooth™ or Wi-Fi, etc. Alternatively, as shown in FIG. 8a, the earpiece 800 has a cable 805 that can be connected to a suitable jack on a computing earpiece 800 that may collect the data, such as a cable connector on a smartphone that can download the data from the earpiece 800 for processing.

Figure 9:
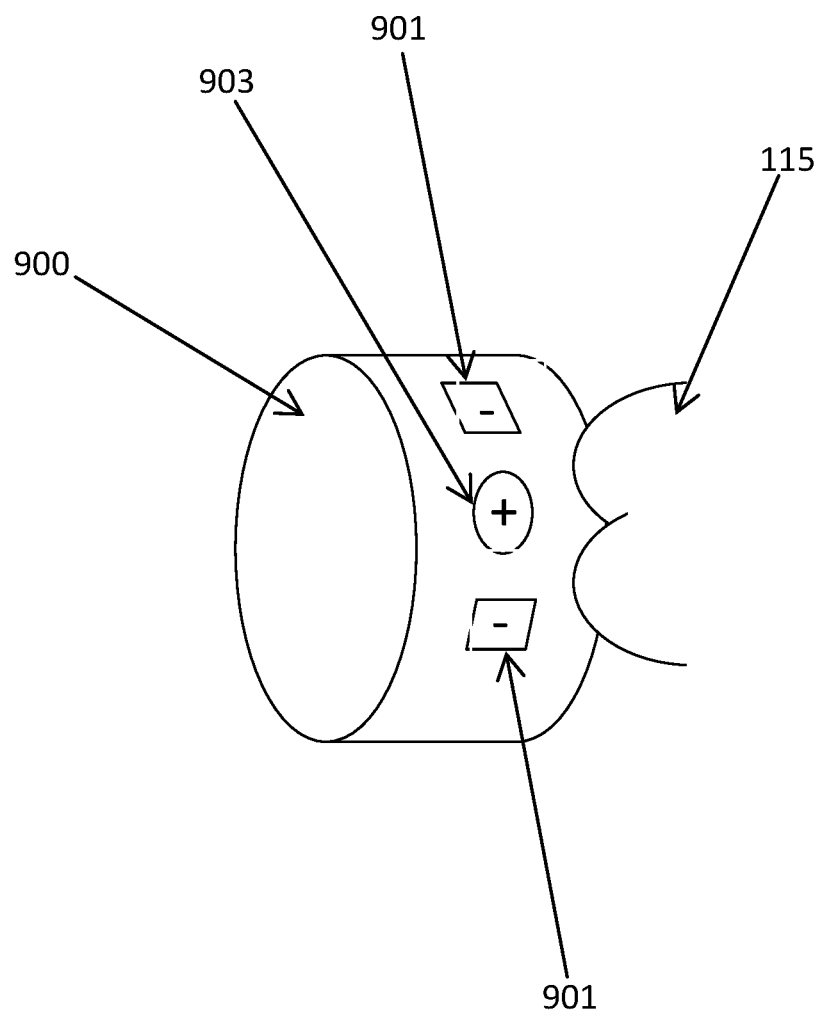
FIG. 9 also shows a variation of the embodiment of FIG. 4.

FIG. 9 shows another earpiece 900 in which the physiological detector is not an optical sensor 303 as aforedescribed. Instead, electrodes are supplied. FIG. 9 shows two negative electrodes 901 and a positive electrode 903 arranged in a column which can be aligned to the tragus 115. The electrodes operate according to circuitry provided within the earpiece 900, and may be part of an impedance monitor, a temperature sensor and so on. An impedance monitor is useful for detecting whether the earpiece 900 is in contact with the skin of the ear. The extra electrode of the same polarity provides redundancy. In FIG. 9, therefore, one of the negative electrodes 901 can be moved out of contact with the tragus 115, such as if the earpiece 900 is rotated anti clockwise when the earpiece 900 is inserted into the left ear. Within a tolerable limit, the other negative electrode 901 remains in contact with the tragus 115 and, together with the positive electrode 903 which is also in contact with the tragus 115, reads physiological information by the contact with the tragus 115. This provides a high likelihood that the earpiece 900 may continue to monitor the physiological condition of the user despite a limited range of rotation of the earpiece 900.

Although FIG. 9 shows a column of negative-positive-negative electrodes 901, 903, the converse having a column of positive-negative-positive electrodes is within contemplation of the embodiment.

Figure 10:
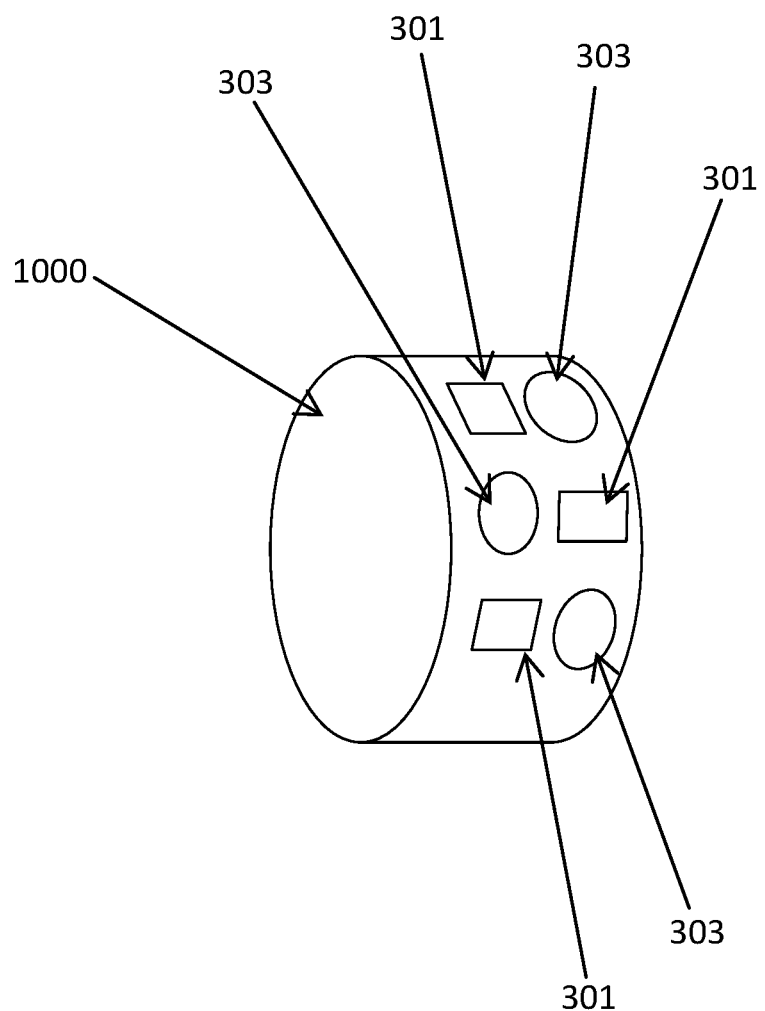
FIG. 10 also shows a variation of the embodiment of FIG. 4.

FIG. 10 shows a further embodiment 1000 wherein there are three light source-optical sensor pairs. Anyone of the pairs may be rotated out of range for interacting with the tragus 115 and, within a limited range, there is at least one other pair which remains capable of interacting with the tragus 115. This also provides continuous physiological monitoring of the user as anyone of the pairs can be moved out of contact with the tragus 115 and does not break the continuity of the physiological monitoring.

Figure 11:
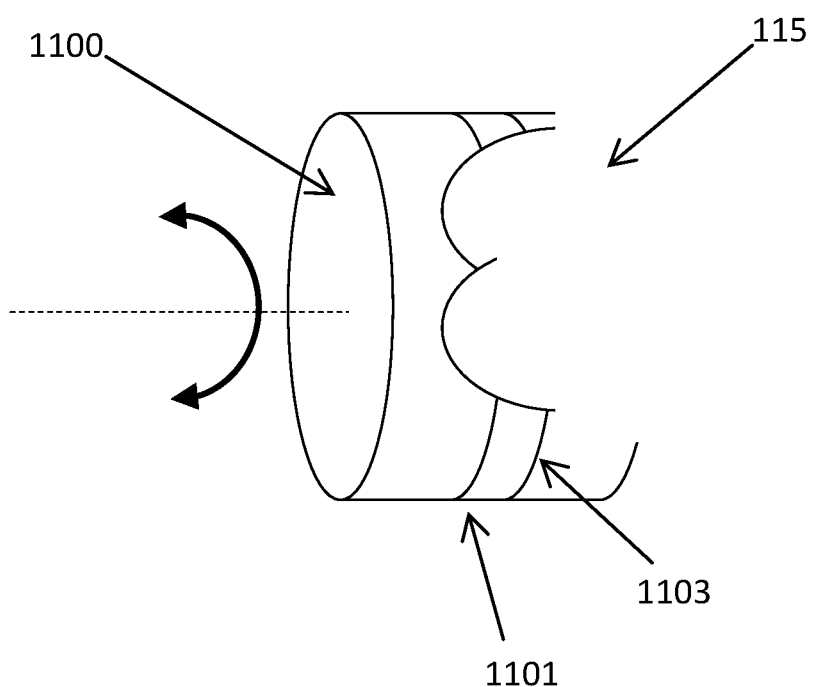
FIG. 11 shows a second embodiment of the invention.

FIG. 11 shows another embodiment 1100 in which there are just two electrodes 1101, 1103. Each electrode is a line of metal contact running along at least a part of the circumference of the disc-like earpiece 1100. One electrode 1103 is placed nearer the inner side of the earpiece 1100 as shown, nearer the ear, and the other electrode 1101 is placed nearer the outer side of the earpiece 1100. Hence, the two electrodes 1101, 1103 are in parallel. The earpiece 1100 can be rotated in the concha 117 without breaking the contact of the electrodes with the tragus, as long as the rotation is within the extent of the length of the electrodes. If the electrodes are laid along the entire circumference, then no amount of rotation may break the contact between the electrodes and the tragus.

Figure 12:
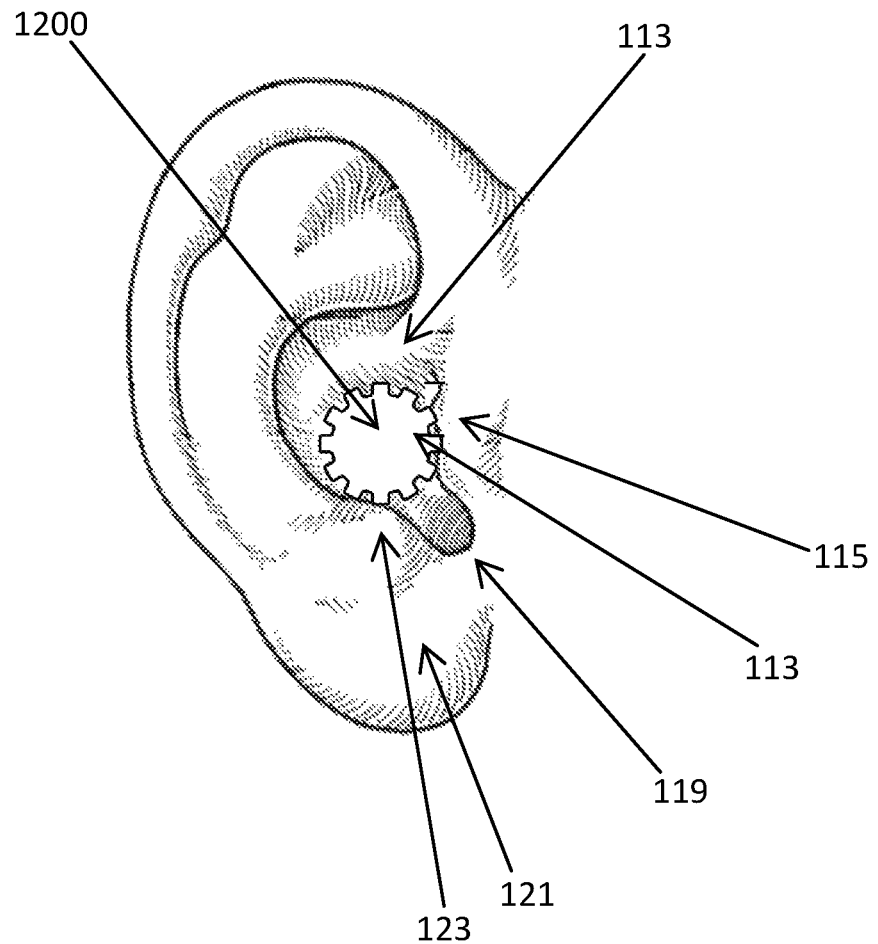
FIG. 12 explains a variation of the embodiment of FIG. 4.

FIG. 12 illustrates a gear like edge on an earpiece 1200, instead of a smooth and continuous edge. FIG. 12 shows how the surface of the edge of the earpiece 1200 in contact with the tragus 115 can have a discontinuous surface area but remains capable of providing continuously physiological monitoring when the earpiece 1200 is rotated in the concha 117. As long as there is enough pieces of discontinuous surfaces which are arrange close enough to each other, and sensor parts are provided on various ones of the discontinuous surfaces, one discontinuous surface having a sensor part may be moved out of contact with the tragus 115 while another discontinuous surface having a sensor part may remain in contact with the tragus 115. In this way, physiological monitoring of the user via contact with the tragus 115 is sustained despite movements of the earpiece 1200.

Accordingly, the described embodiments include an earpiece 200, 400, 700, 1000, 1100, 1200, the earpiece having a shape for fitting into the concha 117 of an ear of an user, the earpiece having a surface for contacting the tragus 115 of the ear; and a physiological sensor arranged on the surface such that the physiological sensor is capable of interacting with the tragus 115. Preferably, the physiological sensor comprises at least one light source 301 and at least one optical sensor 303.

While there has been described in the foregoing description preferred embodiments of the present invention, it will be understood by those skilled in the technology concerned that many variations or modifications in details of design, construction or operation may be made without departing from the scope of the present invention as claimed.

For example, although an optical sensor 303 is described in most of the embodiments, other detectors may be implemented in the embodiments instead. Any kind and every kind of sensors can be added to the device. For example, the earpiece can also comprise temperature sensors, photodiodes, moisture sensors and every other kind of analytical sensors.

The invention claimed is:

1. An earpiece:
   the earpiece having a disk shape having a circumferential surface, the disk shape having dimensions for fitting into the concha of an ear of a user such that the circumferential surface presses against the tragus of the ear;

a physiological sensor arranged on the circumferential surface such that the physiological sensor is capable of interacting with the tragus, the physiological sensor comprising a plurality of sensor parts for interacting with the tragus, the plurality of sensor parts comprising either:

(a) a plurality of light sources and at least one optical sensor vertically arranged in a column with the at least one optical sensor arranged between two of the plurality of light sources, the distance between the two light sources being less than 5 mm; or (b) a plurality of optical sensors or at least one light source vertically arranged in a column with the at least one light source arranged between two of the plurality of optical sensors, the distance between the two optical sensors being less than 5 mm.

2. The earpiece as claimed in claim 1, further comprising a speaker such that the earpiece is useable as an earphone.

\* \* \* \* \*